United States Patent [19]

Tanizawa

[11] Patent Number: 5,615,195
[45] Date of Patent: Mar. 25, 1997

[54] DATA RECORDING AND REPRODUCING APPARATUS

[75] Inventor: Seiji Tanizawa, Kanagawa, Japan

[73] Assignee: Sony Corporation, Japan

[21] Appl. No.: 362,906

[22] Filed: Dec. 23, 1994

[30] Foreign Application Priority Data

Dec. 28, 1993 [JP] Japan .................................. 5-337671

[51] Int. Cl.⁶ ...................................................... G11B 7/00
[52] U.S. Cl. .............................. 369/60; 369/59; 369/48; 369/32; 369/124; 360/48
[58] Field of Search .................................. 369/60, 59, 47, 369/48, 49, 54, 124, 32, 58; 360/29, 32, 48, 39, 40

[56] References Cited

U.S. PATENT DOCUMENTS

| | | | |
|---|---|---|---|
| 4,393,502 | 7/1983 | Tanaka et al. | |
| 4,697,212 | 9/1987 | Osawa et al. | |
| 4,961,204 | 10/1990 | Tanaka et al. | 360/32 X |
| 5,424,879 | 6/1995 | Yamada et al. | 360/29 X |
| 5,491,592 | 2/1996 | Aramaki et al. | 360/32 X |

FOREIGN PATENT DOCUMENTS 60-187973  9/1985  Japan .
60-191471  9/1985  Japan .

*Primary Examiner*—Muhammad N. Edun
*Attorney, Agent, or Firm*—Ronald P. Kananen

[57] ABSTRACT

A data recording apparatus for recording quantized data at every predetermined fundamental unit includes a quantizing circuit for quantizing a consecutive signal with a predetermined sampling frequency to generate quantized data, a separating circuit for separating each sample of the quantized data at every predetermined fundamental unit, a fundamental unit generating circuit for separating samples of the quantized data of every fundamental unit into odd-numbered group formed of odd-numbered samples and even-numbered group formed of even-numbered samples and disposing the an odd-numbered group and the an even-numbered group so that one of the odd-numbered group and the even-numbered group is disposed in the first half of the fundamental unit and the other is disposed in the second half of the fundamental unit to thereby form quantized data of every fundamental unit, a recording circuit for recording the quantized data on a recording medium, and a recording control circuit for controlling the recording so that at least two consecutive quantized data of every recording fundamental unit are recorded in substantially consecutive positions on the recording medium.

10 Claims, 9 Drawing Sheets

Sampling/Quantization

Generate Fundamental Unit or

Group Data

Add Error-Correction Code Etc.

Recording Fundamental Unit Data

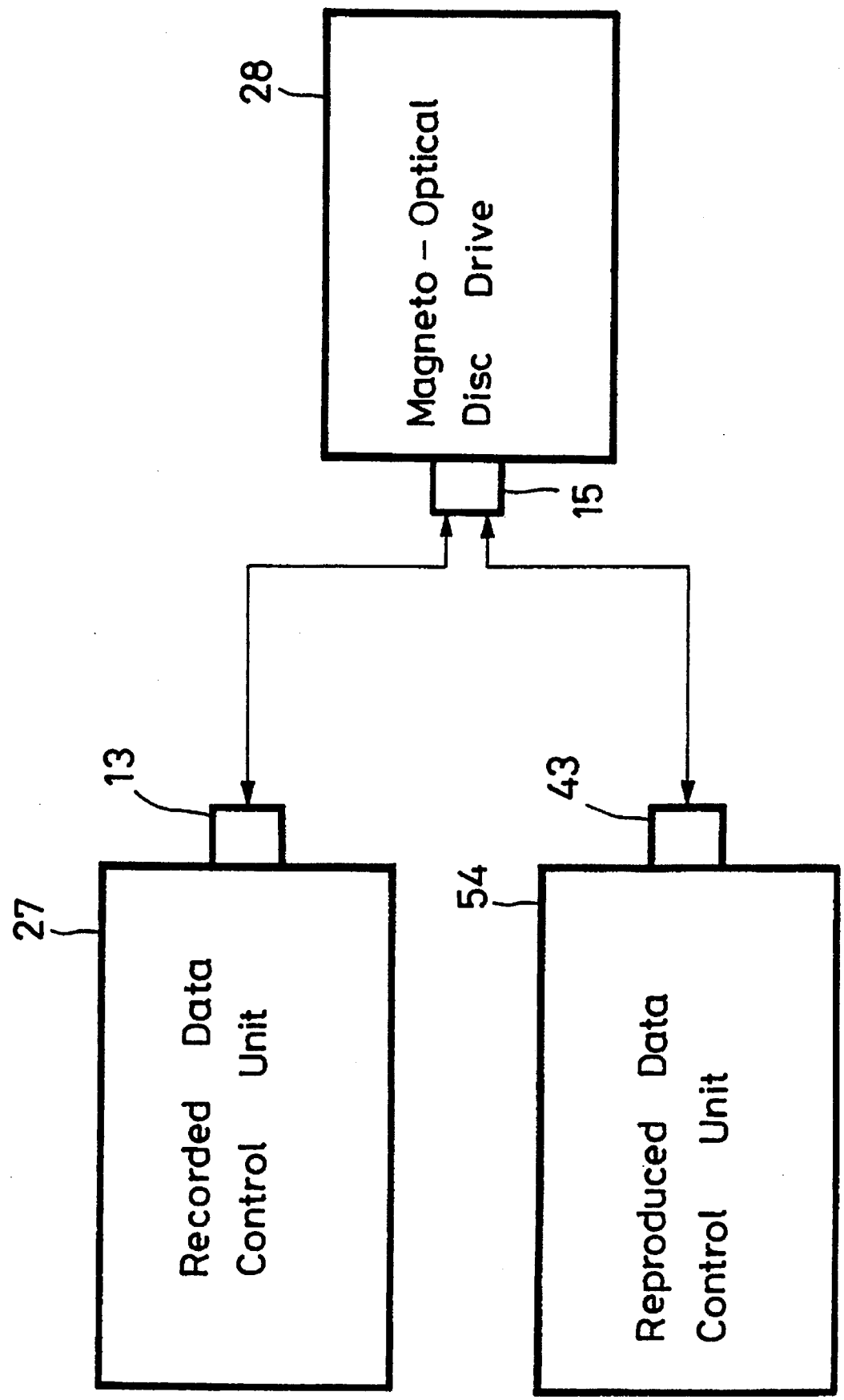

FIG. 4
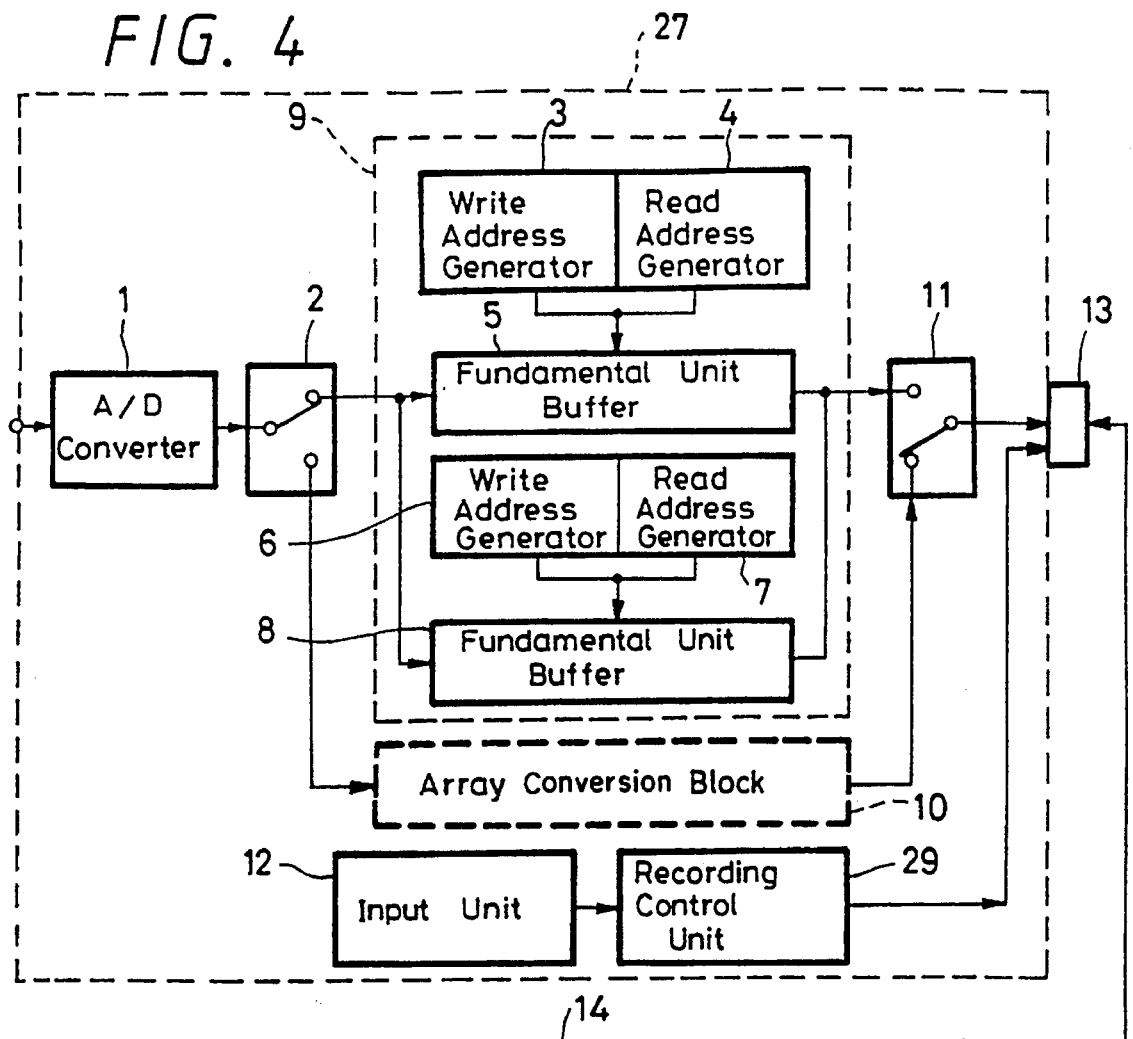
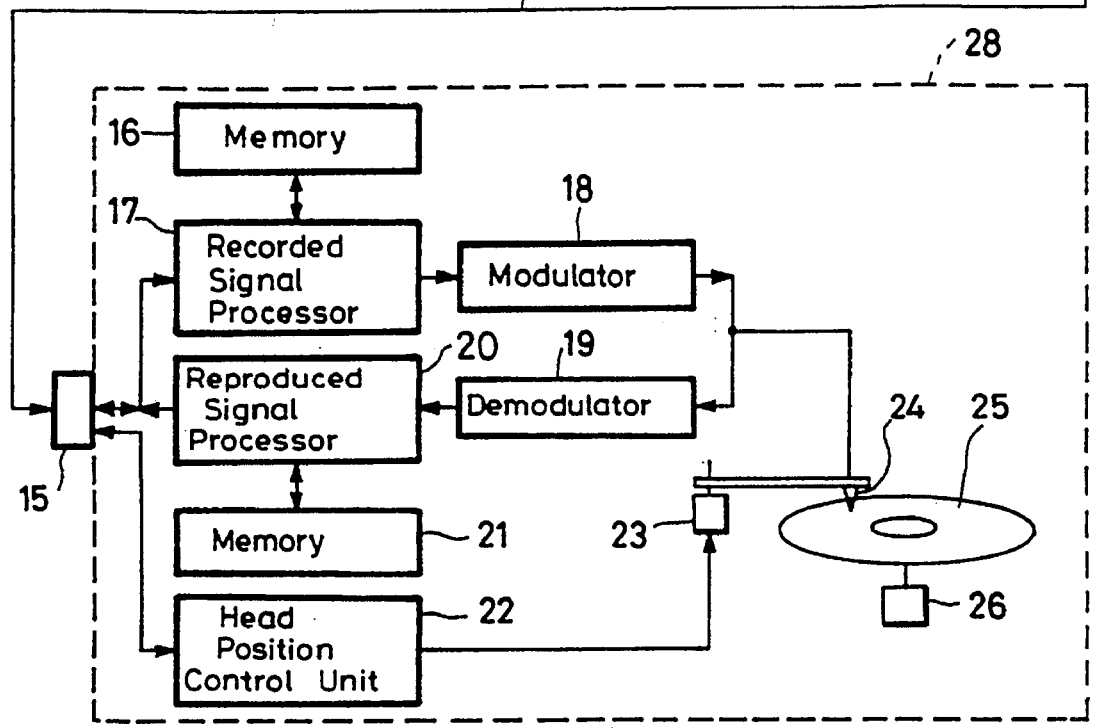

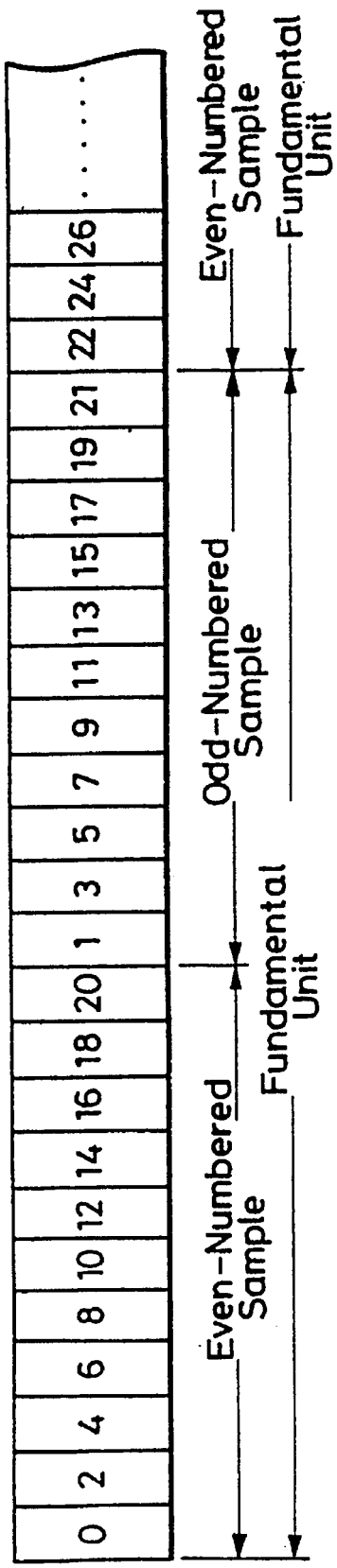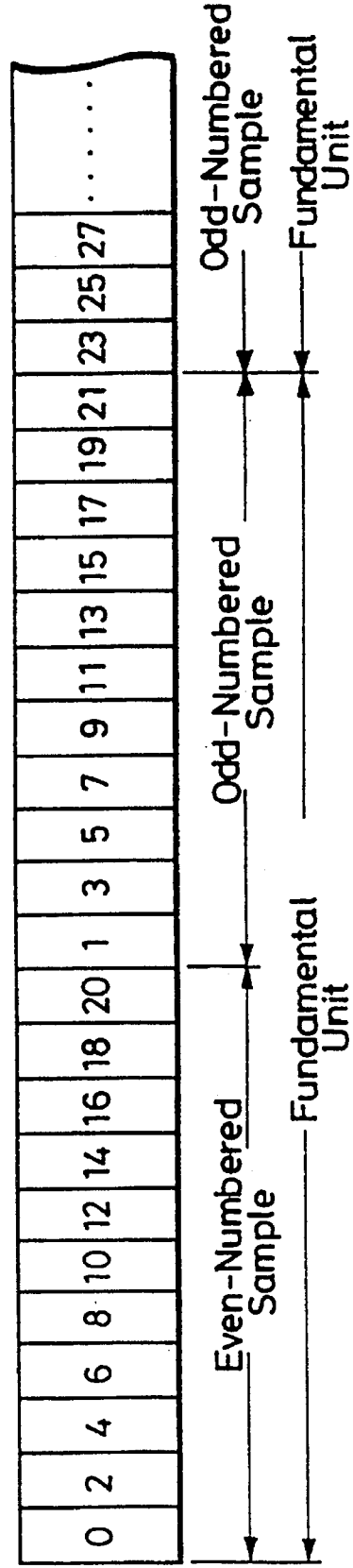

ved at one
DATA RECORDING AND REPRODUCING APPARATUS

BACKGROUND OF THE INVENTION

The present invention relates to a data recording and reproducing apparatus for use in reproducing data at high speed.

Known recording and reproducing apparatus are able to record and reproduce data by directly accessing an arbitrary recording and reproducing position unlike hard disk apparatus and magneto-optical disk apparatus which record and reproduce data in the order of time series.

Data handled by the hard disk apparatus and the magneto-optical disk apparatus are formed of 512-byte blocks and collected in the unit of sectors. Upon recording, it is customary that data are recorded on a recording medium at the unit of clusters each of which is formed of 8 sectors, for example.

When data of a certain unit amount is recorded on a recording medium as one cluster, if consecutive data, such as an audio signal or the like from a time standpoint, is recorded on the recording medium, then it is frequently observed that a plurality of consecutive data from a time standpoint are recorded on the recording medium at physically distant positions.

In this case, when data that is recorded at a plurality of fundamental units is reproduced, it is unavoidable that a reproducing head is physically moved at connected portions of the fundamental units. Thus, a useless time occurs. This disadvantage will be described below with reference to FIG. 1 of the accompanying drawings.

In FIG. 1, Rb [bps] assumes a read speed of a reproducing head, A [sec] assumes a moving speed of the reproducing head, S [bit] assumes fundamental unit data amount, Fs [Hz] assumes a data sampling frequency and Qi [bit] assumes data quantization bit rate.

At that time, a data read time with which the reproducing head reads fundamental unit data 1 to 4 recorded on a recording medium 80 at its arbitrary positions is given by S/Rb [sec]. On the other hand, a fundamental unit reproducing time which a recording and reproducing apparatus outputs at one time normal speed is given by S/(Q1·Fs)[sec]. Unless the reproducing head is moved to the next fundamental unit and reads data during the recording and reproducing apparatus reproduces data of one fundamental unit, then an output of the recording and reproducing apparatus becomes discontinuous. Thus, we have: (S/Rb)+A≦S/(Q1·Fs)

When the recording and reproducing apparatus reproduces data at twice normal speed, a fundamental unit reproducing time is given by S/(Q1·Fs·2) [sec] and the condition equation is given by (S/Rb)+A≦S (Q1·Fs·2) [sec]. The read speed Rb of the reproducing head is constant for the same medium and the moving time A of the reproducing head also is constant. Thus, if the data sampling frequency Fs and the data quantization bit rate Q1 are made constant, then when the recording and reproducing apparatus reproduces data at twice normal speed, it is necessary to increase the fundamental unit data amount S as compared with the case that the recording and reproducing apparatus reproduces data at one time normal speed. As the fundamental unit data amount is increased, a standby time required when data is accessed is increased.

Further, in the recording and reproducing apparatus, if the reproducing speed is selected to be one time normal speed, e.g., twice normal speed, then data has to be read within a half time of a time required when data is reproduced at one time normal speed. In order to read data within the half time, data of the increased fundamental unit data amount S has to be processed. There is then the disadvantage that it is difficult to design such recording and reproducing apparatus in actual practice.

SUMMARY OF THE INVENTION

In view of the aforesaid aspect, it is an object of the present invention to provide a recording and reproducing apparatus in which the aforesaid problems can be solved.

According to a first aspect of the present invention, there is provided a data recording apparatus for recording quantized data at every predetermined fundamental unit. The data recording apparatus is comprised of a quantizing circuit for quantizing a consecutive signal with a predetermined sampling frequency to generate quantized data, a separating circuit for separating each sample of the quantized data at every predetermined fundamental unit, a fundamental unit generating circuit for separating samples of the quantized data of every fundamental unit into an odd-numbered group formed of odd-numbered samples and an even-numbered group formed of even-numbered samples and disposing the odd-numbered group and the even-numbered group so that one of the odd-numbered group and the even-numbered group is disposed in a first half of the fundamental unit and the other is disposed in a second half of the fundamental unit to thereby form quantized data of every fundamental unit, a recording circuit for recording the quantized data on a recording medium, and a recording control circuit for controlling the recording means so that at least two consecutive quantized data of every recording fundamental unit are recorded on the recording medium at its substantially consecutive position.

According to a second aspect of the present invention, there is provided a data reproducing apparatus for reproducing quantized data recorded on a recording medium at every predetermined fundamental unit. The data reproducing apparatus is comprised of a reproducing circuit for reproducing the quantized data at every fundamental unit from a recording medium in which recording quantized data of at least two recording fundamental units in which quantized data resulting from quantizing a consecutive signal with a predetermined sampling frequency is separated at every predetermined fundamental unit, samples of the quantized data of the fundamental unit are separated to an odd-numbered group formed of odd-numbered samples and an even-numbered group formed of even-numbered samples and the odd-numbered group and the even-numbered group are arranged so that one of the odd-numbered group and the even-numbered group is disposed on a first half of the recording fundamental unit and the other is disposed on a second half, and a reproducing control circuit for controlling the reproducing circuit so that, upon variable speed reproduction at a speed higher than one time normal speed, quantized data of one fundamental unit is reproduced from a starting portion of the odd-numbered group or the even-numbered group disposed on the second half of a recording fundamental unit of the first half of the two continuously recorded recording fundamental units.

According to a third aspect of the present invention, there is provided a data recording method for recording quantized data on a recording medium at every predetermined fundamental unit. The data recording method is comprised of the steps of quantizing a consecutive signal at a predetermined sampling frequency to obtain quantized data, separating samples of the quantized data at every predetermined fundamental unit, separating samples of the quantized data of every fundamental unit to an odd-numbered group formed of odd-numbered samples and an even-numbered group formed of even-numbered samples, forming quantized data of every recording fundamental unit by arranging the odd-numbered group and the even-numbered group such that one of the odd-numbered group and the even-numbered group is disposed on a first half of the recording fundamental unit and the other is disposed on a second half, and recording the quantized data on the recording medium so that consecutive quantized data of at least two recording fundamental units are recorded on the recording medium at its substantially continuous position.

According to a fourth aspect of the present invention, there is provided a data recording and reproducing method for recording and reproducing quantized data on and from a recording medium at every predetermined fundamental unit. The data recording and reproducing method is comprised of the steps of quantizing a consecutive signal at a predetermined sampling frequency to obtain quantized data, separating samples of the quantized data at every predetermined fundamental unit, separating samples of the quantized data of every fundamental unit to an odd-numbered group formed of odd-numbered samples and an even-numbered group formed of even-numbered samples, forming quantized data of every recording fundamental unit by arranging the odd-numbered group and the even-numbered group such that one of the odd-numbered group and the even-numbered group is disposed on a first half of the recording fundamental unit and the other is disposed on a second half, recording the quantized data on the recording medium so that consecutive quantized data of at least two recording fundamental units are recorded on the recording medium at its substantially continuous position, and reproducing the quantized data at a variable speed higher than one time normal speed by reproducing quantized data at every recording fundamental unit from a starting portion of the odd-numbered group or the even-numbered group disposed on the second half of a recording fundamental unit disposed on the first half of two recording fundamental units continuously recorded on the recording medium.

BRIEF DESCRIPTION OF THE DRAWINGS

FIG. 3 is a schematic block diagram showing an overall block of the present invention;

FIG. 4 is a block diagram showing a recording data control unit and a magneto-optical disk drive according to the present invention in detail;

FIGS. 9A and 9B are schematic diagrams used to explain twice normal speed reproduction operation in the patterns shown in FIGS. 5A and 5C according to the present invention.

DETAILED DESCRIPTION OF THE PREFERRED EMBODIMENT

The present invention will now be described with reference to the drawings.

How to generate recording fundamental unit data according to the present invention will be described with reference to FIGS. 2A through 2F.

Figure 1:
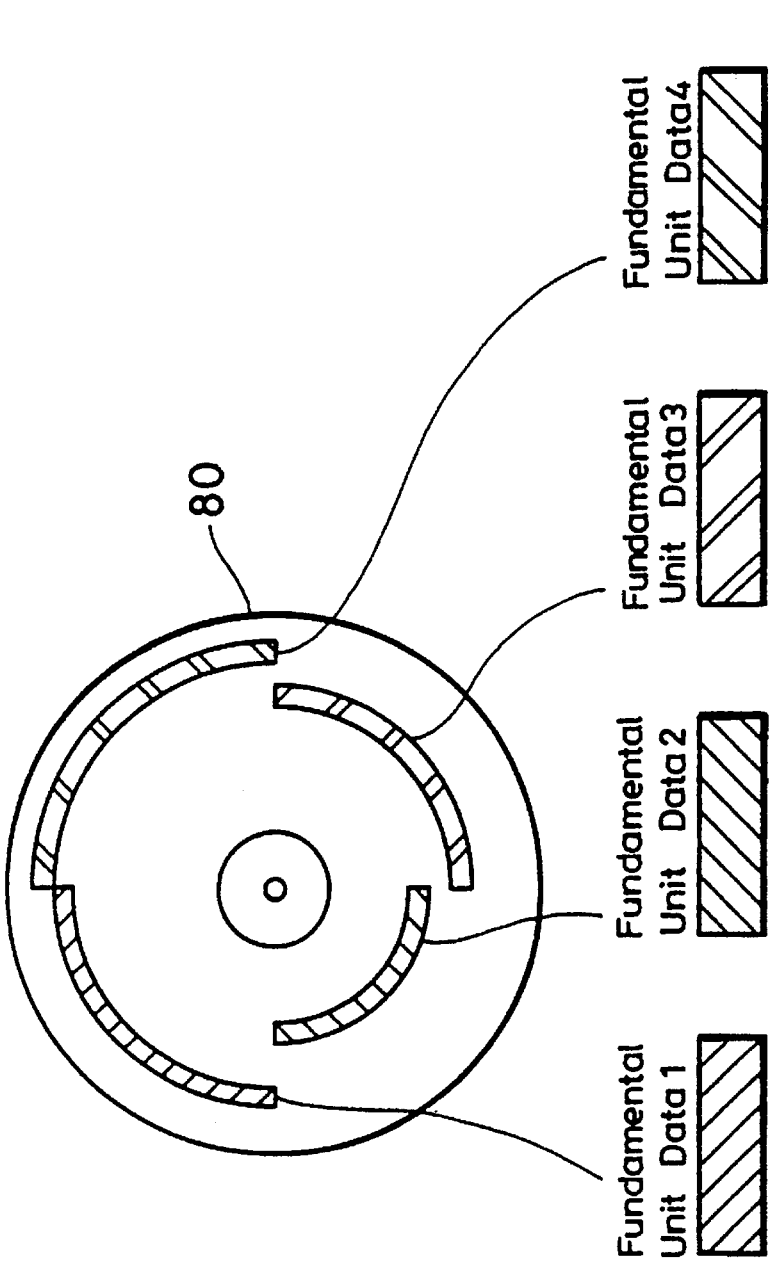
FIG. 1 is a schematic diagram used to explain a recording and reproducing method of a previously-proposed data recording and reproducing apparatus.
Figure 2A:
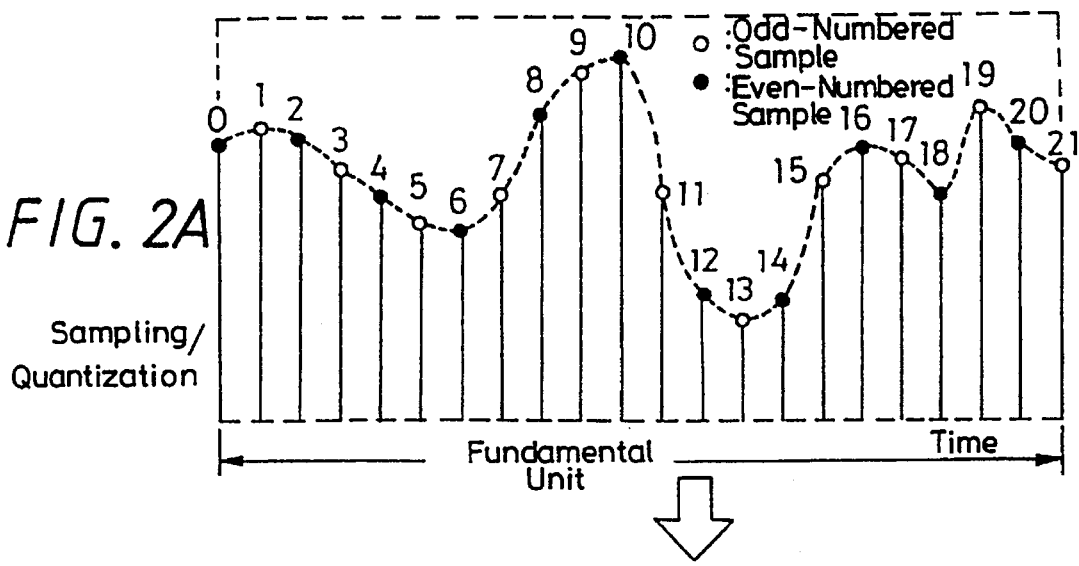
FIGS. 2A through 2F are schematic diagrams used to explain a method of generating recording fundamental unit data according to the present invention.
Figure 2B:
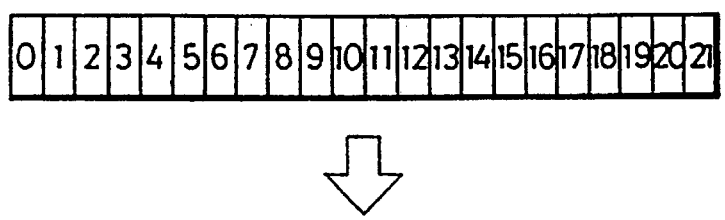

Initially, as shown in FIG. 2A, even-numbered samples of music signal sampled at a sampling frequency of 48 kHz and quantized at a bit rate of 16 bits are clustered to generate one fundamental unit shown in FIG. 2B.

Figure 2C:
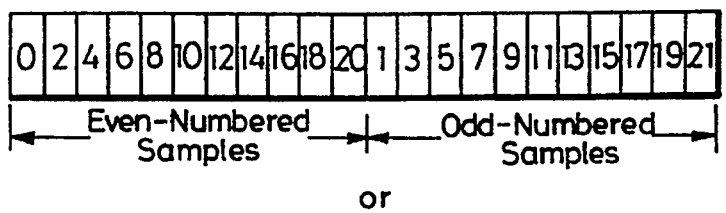
Figure 2D:
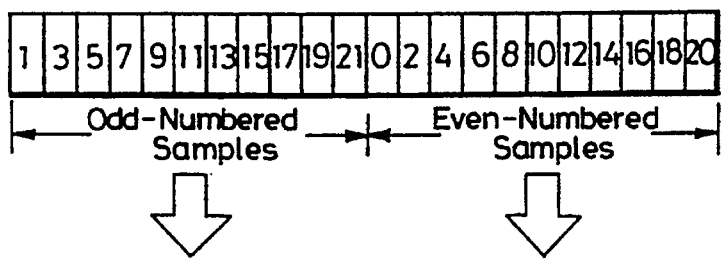
Figure 2E:

Then, as shown in FIG. 2C, consecutive 16-bit samples are grouped as even-numbered samples and odd-numbered samples, whereby the even-numbered samples are arranged in the former half of a fundamental unit and the odd-numbered samples are arranged in the latter half of the fundamental unit to generate the fundamental unit. Conversely, the odd-numbered sample may be arranged in the former half of the fundamental unit and the even-numbered samples may be arranged in the latter half of the fundamental unit to generate the fundamental unit. Accordingly, the fundamental unit is composed of two groups of a group of even-numbered samples and a group of odd-numbered samples.

Figure 2F:
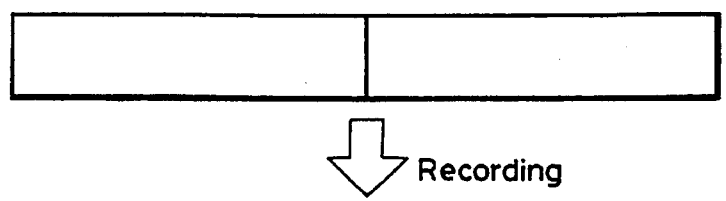

Data of the fundamental unit composed of the two groups may be recorded as it is. However, when data is processed by some suitable processings, such as addition of error-correction code and interleaving, data has to be processed independently at the unit of groups. A synchronizing (sync) signal also has to be independently added to data of each group. Therefore, as shown in FIG. 2F, it is possible to obtain recording fundamental unit data.

While data is grouped to provide the even-numbered samples and the odd-numbered samples as described above, the present invention is not limited thereto and data can be grouped into smaller units.

FIG. 3 is a schematic block diagram showing an overall arrangement of a data recording and reproducing apparatus according to the present invention. As shown in FIG. 3, data output through an interface circuit 13 through a recording data control unit 27 is supplied through an interface circuit 15 to a magneto-optical disk drive 28. Data reproduced by the magneto-optical disk drive 28 is output through the interface circuit 15 and supplied through an interface circuit 43 to a reproduced data control unit 54. The data recording and reproducing apparatus is not limited to the magneto-optical disk drive 28 and may be other suitable data recording and reproducing apparatus, such as a hard disk drive or the like.

FIG. 4 shows in block form the recorded data control unit 27 and the magneto-optical disk drive 28 in detail.

As shown in FIG. 4, a consecutive analog signal is supplied to an analog-to-digital (A/D) converter 1, in which it is sampled and quantized. A digitized signal from the A/D converter 1 is written in one of fundamental unit buffers 5, 8 having a storage capacity of fundamental unit data.

An array conversion matrix 9 handles data twice as large as the fundamental unit data. First fundamental unit data is written in the fundamental unit buffer 5 and second fundamental unit data is written in the fundamental unit buffer 8.

Write addresses at which data are written in the fundamental unit buffers 5, 8 are controlled by write address generators 3, 6, respectively. In this case, the write address generators 3, 6 generate addresses of the same order as the input order of data into the fundamental unit buffers 5, 8 so that data are written in the fundamental unit buffers 5, 8.

Read addresses of data from the fundamental unit buffers 5, 8 are controlled by read address generators 4, 7, respectively. In this case, even-numbered addresses in the fundamental unit data are sequentially generated and then odd-numbered addresses in the fundamental unit data are sequentially generated or odd-numbered addresses in the fundamental unit data are sequentially generated and then even-numbered addresses in the fundamental unit data are sequentially generated, thereby read data being separated into even-numbered groups and odd-numbered groups.

If write addresses are not generated in the input order of respective samples but generated in the separated form of even-numbered samples and odd-numbered samples, then it is possible to separate samples output from the fundamental unit buffers 5, 8 into even-numbered groups and odd-numbered groups by monotonically increasing read addresses.

Further, if output samples are initially obtained from the fundamental unit buffer 5 and then obtained from the fundamental unit buffer 8, then it is possible to obtain two consecutive fundamental unit data composed of even-numbered samples and odd-numbered samples. The orders in which the read address generators 4, 7 generate even-numbered addresses and odd-numbered addresses are not always the same but may be different from each other.

As the array conversion block, there are provided a plurality of array conversion blocks, such as array conversion blocks 9, 10. Digitized data from the A/D converter 1 are switched by a switcher 2 and sequentially supplied to one of the array conversion blocks 9, 10. The reason for this is to prevent previously-written data from being destroyed when the next fundamental unit data is written while data is read out from the array conversion block 9 in which data is previously written.

A switcher 11 is provided so that two consecutive fundamental unit data may be read out from the array conversion block 9 in which data is previously written. It is needless to say that, even if there are provided more than the two array conversion blocks 9 and 10, the above-mentioned operation would not be affected at all.

An input unit 12 is provided in order to designate start address and data length data each used to record the two consecutive fundamental unit data composed of the even-numbered group and the odd-numbered group. A recording control unit 29 outputs control data to the magneto-optical disk drive 28 based on the start address and the data length data supplied thereto from the input unit 12. The control data is supplied through the data interface circuit 13, a data transfer line 14 and the data interface circuit 15 from the recording control unit 29 to the magneto-optical disk drive 28.

The data transfer line 14 is formed of an SCSI (small computer systems interface) to transfer control data. When the recorded data control unit 27 and the magneto-optical disk drive 28 are formed integrally, the data transfer line 14 of course need not be provided.

The data supplied to the magneto-optical disk drive 28 is added with the error-correction code, interleaved and added with the sync signal by a recorded signal processor 17. Output data from the recorded signal processor 17 is supplied through a modulator 18 and recorded by a recording and reproducing head 24 on a magneto-optical disk 25 rotated by a rotation motor 26.

At least two consecutive fundamental unit data are recorded on the magneto-optical disk 25 at its substantially consecutive positions. In other words, "substantially" means that a little physical spacing may be provided between the recorded positions of the two fundamental unit data and that the two fundamental unit data can be continuously reproduced without movement of the recording and reproducing head 24.

The two consecutive fundamental unit data may be recorded at substantially consecutive positions, and fundamental unit data after the third fundamental unit data may be recorded at substantially discontinuous positions, i.e., positions which the recording and reproducing head 24 has to seek. It is apparent that two consecutive data are recorded at substantially consecutive positions with satisfactory action and effects being achieved.

Figure 5B:
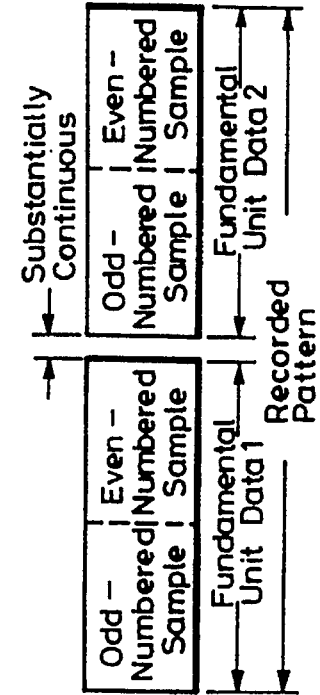
FIGS. 5A through 5E are schematic diagrams showing examples of recording patterns according to the present invention.
Figure 5D:
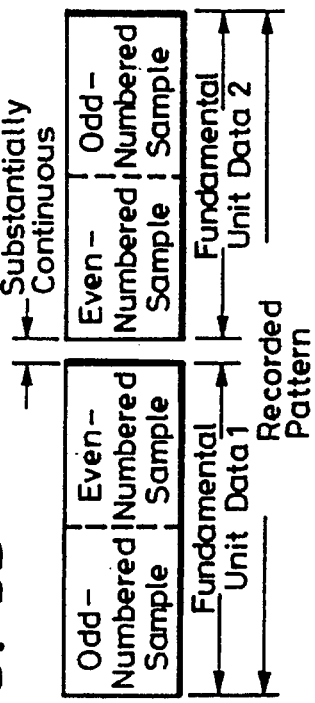
Figure 5A:
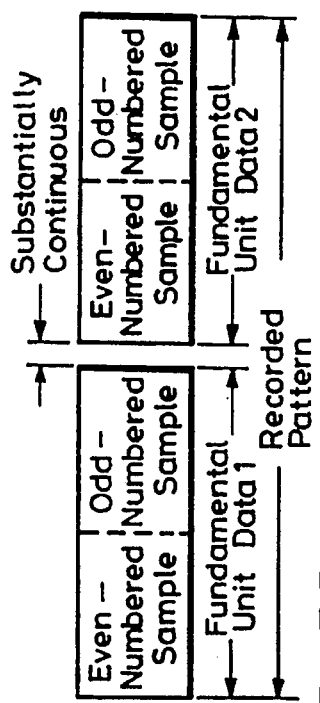
Figure 5C:
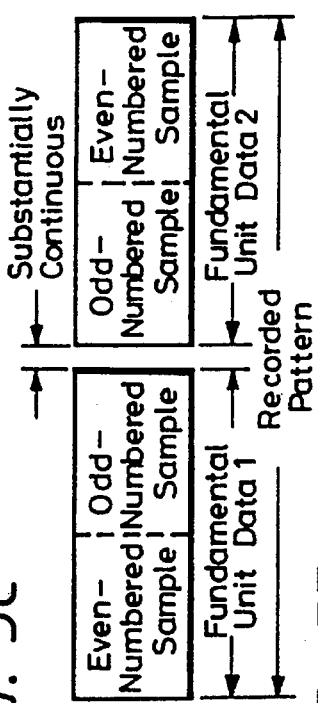
Figure 5E:
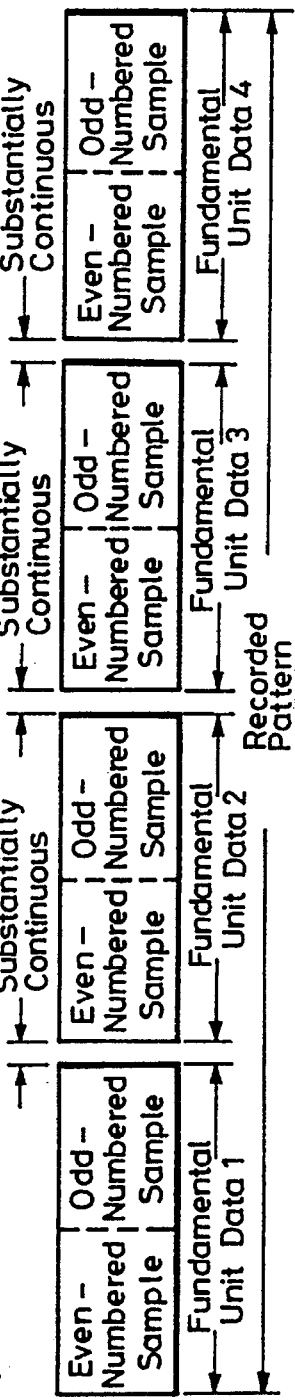

Examples of recorded patterns of data recorded on the magneto-optical disk 25 will be described below with reference to FIGS. 5A through 5E. FIGS. 5A and 5B show that the array orders of even-numbered samples and odd-numbered samples within respective fundamental unit data when fundamental unit data 1 and 2 are recorded substantially continuously. FIGS. 5C and 5D show that the array orders of even-numbered samples and odd-numbered samples within respective fundamental unit data are different when the fundamental unit data 1 and 2 are recorded substantially continuously. FIG. 5E shows that the array orders of even-numbered samples and odd-numbered samples within respective fundamental unit data are the same when fundamental unit data 1, 2, 3 and 4 are recorded substantially continuously. While at least two consecutive fundamental unit data are shown as described above, the present invention is not limited thereto and data of only one fundamental unit recorded one at a time can satisfactorily be reproduced. In this case, effects achieved by the present invention when data is reproduced at twice normal speed cannot be achieved.

Figure 6:
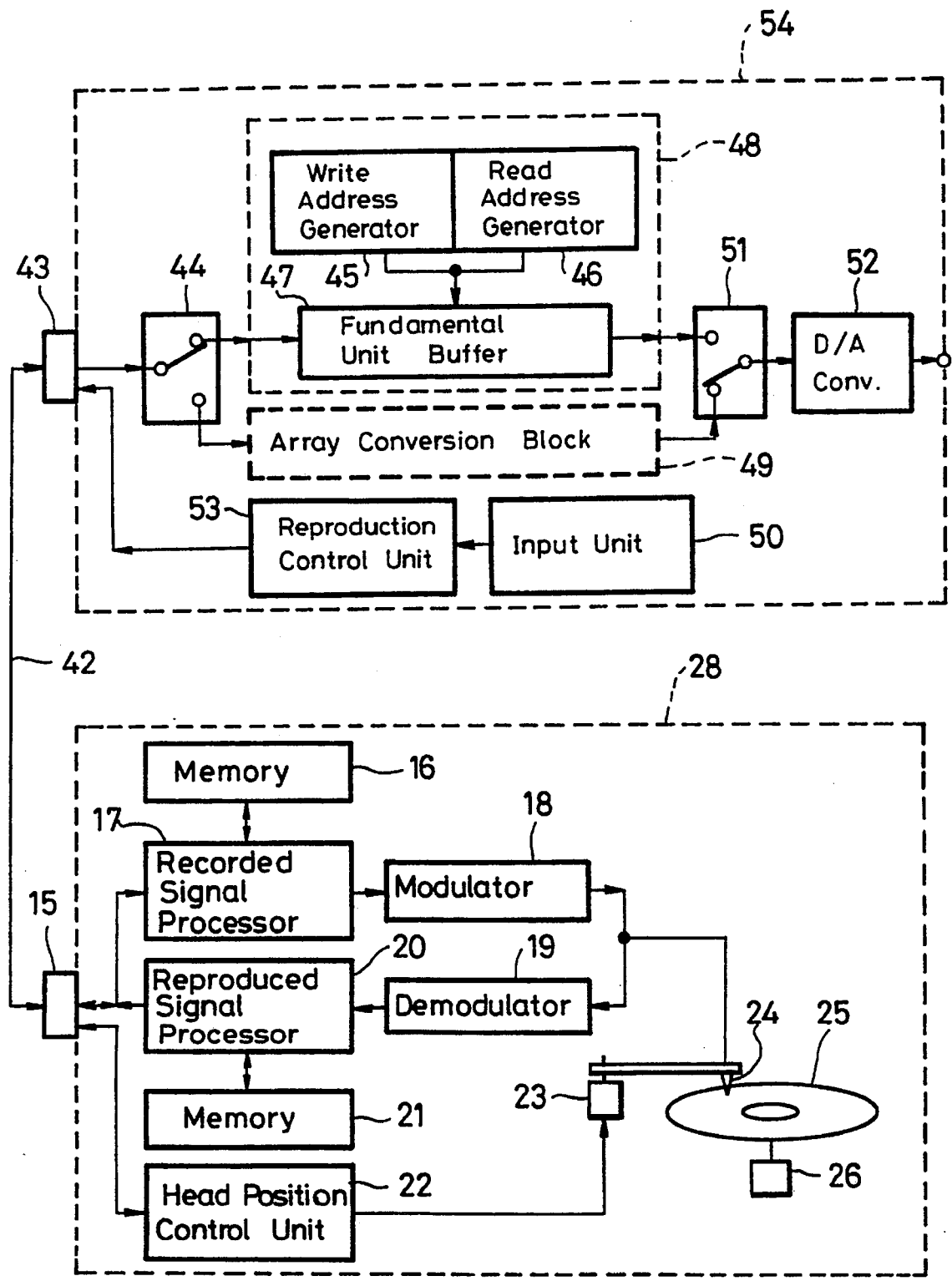
FIG. 6 is a block diagram showing in detail a reproducing data control unit and a magneto-optical disk drive according to the present invention.

FIG. 6 is a block diagram showing in detail the reproduced data control unit 54 and the magneto-optical disk drive 28 shown in FIG. 3 according to the embodiment of the present invention. As shown in FIG. 6, an input unit 50 of the reproduced data control unit 54 designates start address and data length data. Also, the input unit 50 designates reproduction of one time normal speed and reproduction of twice normal speed. The start address, the data length data and the data concerning reproduction speeds entered by the input unit 50 are supplied to a reproduction control unit 53. The reproduction control unit 53 controls array conversion blocks 48, 49 and switchers 44, 51 based on the entered data through control lines (not shown) and outputs control data through the interface circuit 43 to the magneto-optical disk drive 28. The control data is input through the data transfer line 42 and the interface circuit 15 to the magneto-optical disk drive 28. A head position control unit 22 drives the position control motor 23 based on the control data supplied thereto from the interface circuit 15 to thereby position the recording and reproducing head 24. Thus, recorded data is read out from the magneto-optical disk 25. The data read out from the magneto-optical disk 25 is demodulated by a demodulator 19, corrected for error and interleaved by a memory 21 and a reproduced signal processor 20. A sync signal is detected from the demodulated data. Output data from the reproduced signal processor 20 is transferred through the interface circuit 15, the data transfer line 42 and the interface circuit 43 to the reproduced data control unit 54.

The resulting reproduced data is written in the fundamental unit buffer 47. An array conversion block 48 generates an original consecutive signal by rearranging samples separated into the even-numbered group and the odd-numbered group. In that case, a write address generator 45 generates a write address which monotonically increases, and thereby samples are written in the fundamental unit buffer 47. Then, a read address generator 46 sequentially generates first address of odd-numbered sample and first address of even-numbered address as read address which increase alternately.

By way of example, when the samples are arrayed as shown in FIG. 2C, the write address generator 45 generates 0, 1, 2, . . . , 19, 20, 21 as write address, in that order. The read address generator 46 generates 11, 0, 12, 1, 13, 2, 14, . . . , 20, 9, 21, 10 as read address, in that order, thereby making it possible to obtain the original consecutive signal.

As another array conversion method done by the array conversion block 48, there is provided a method in which the processing in the writing and the processing in the reading are reversed for the above-mentioned operation. In this case, in the example shown in FIG. 2C, the write address generator 45 generates write addresses in the sequential order of 11, 0, 12, 1, 13, . . . , 20, 9, 21, 10 and the read address generator 46 generates read addresses in the sequential order of 0, 1, 2, . . . , 19, 20, 21, thereby making it possible to obtain the original consecutive signal.

A data train in which data are rearranged and made continuous is converted by a digital-to-analog (D/A) converter 52. There are provided more than two array conversion blocks 48, 49 to which data are sequentially supplied by a switcher 44. The reason for this is to prevent previously-recorded data from being destroyed when the next fundamental unit data is written in the fundamental unit buffer 47 while data is read out from the fundamental unit buffer 47. A switcher 51 is controlled by the reproduction control unit 53 connected thereto via a control line (not shown) so that the switcher 51 sequentially selects an output of the array conversion block from which data is now read.

Operation of the reproduction control unit 58 will be described with reference to a flowchart of FIG. 7.

Figure 7:
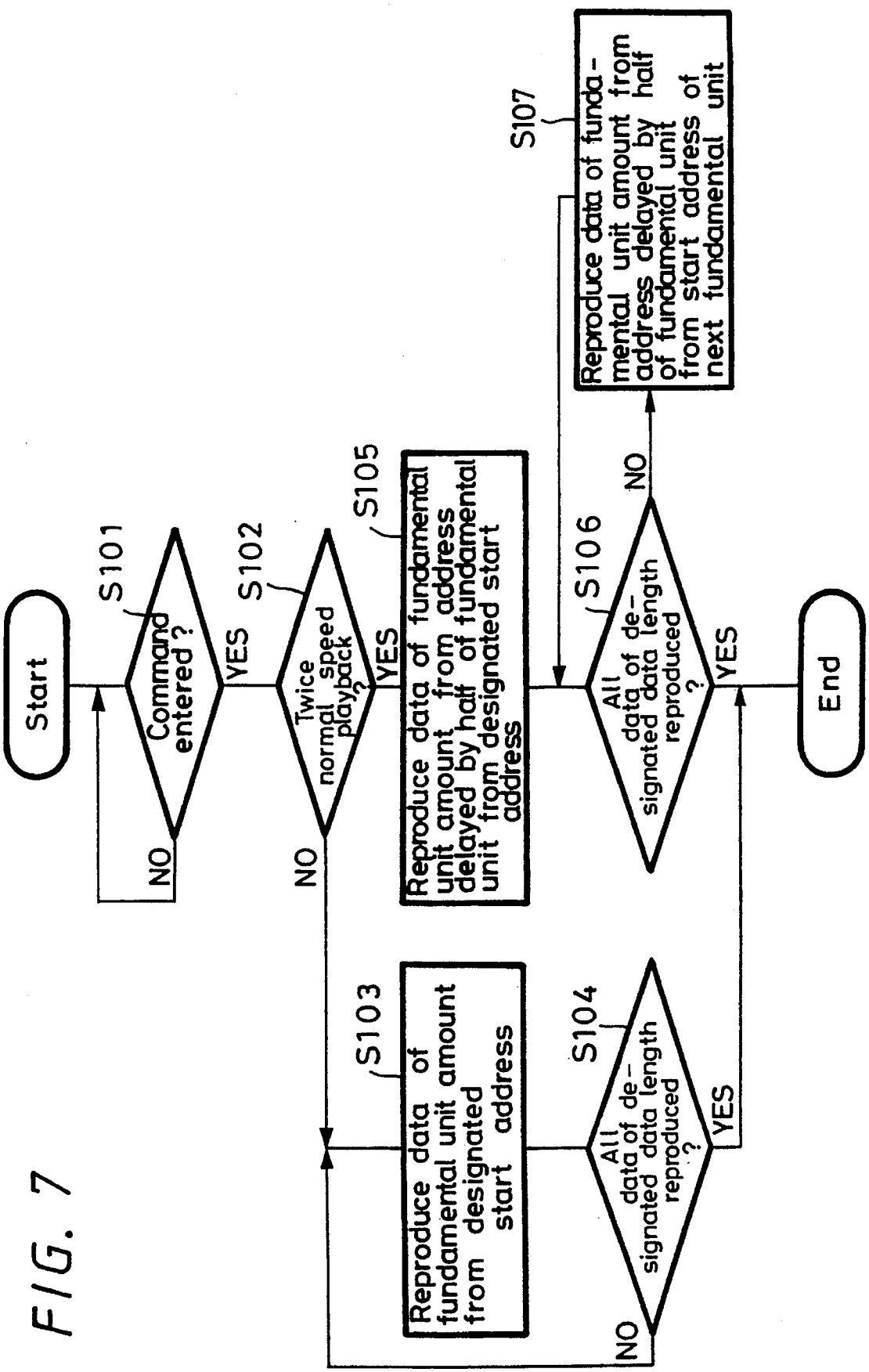
FIG. 7 is a flowchart to which reference will be made in explaining operation of a reproduction control unit according to the present invention.

Referring to FIG. 7, following the start of operation, it is determined in decision step S101 whether or not a command is entered by the input unit 50. This decisions step S101 is repeated until the command is entered by the input unit 50. If the command is entered as represented by a YES at decision step S101, then the processing proceeds to the next decision step S102. It is determined in decision step S102 whether or not the entered command is a command which enables the twice normal speed reproduction to be carried out. If the command is not the twice normal speed reproduction command, i.e., one time normal speed reproduction command as represented by a NO at decision step S102, then the processing proceeds to step S103, whereat a command that instructs data of fundamental unit to be reproduced from the designated start address is output through the interface circuit 43 to the magneto-optical disk drive 28. Then, the processing proceeds to the next decision step S104. It is determined in decision step S104 whether or not data of the designated data length are all reproduced. If all data of the designated data length are not reproduced as represented by a NO at decision step S104, the processing returns to step S103 and the following step is repeated. If all data of the designated data length are reproduced as represented by a YES at decision step S104, then the processing is ended.

If the entered command is the twice normal speed reproduction command as represented by a YES at decision step S102, then the processing proceeds to step S105. In step S105, a command that instructs data of fundamental unit amount to be reproduced from an address delayed by a half of the fundamental unit from the designated start address is output through the interface circuit 43 to the magneto-optical disk drive 28. In the next decision step S106, it is determined whether or not all data of the designated data length are reproduced. If all data of the designated data length are not reproduced as represented by a NO at decision step S106, then the processing proceeds to step S107. In step S107, a command that instructs data of fundamental unit amount delayed by a half of fundamental unit is reproduced from the start address of the next fundamental unit is output through the interface circuit 43 to the magneto-optical disk drive 28. If all data of the designated data length are reproduced as represented by a YES at decision step S106, then this processing is ended.

Figure 8:
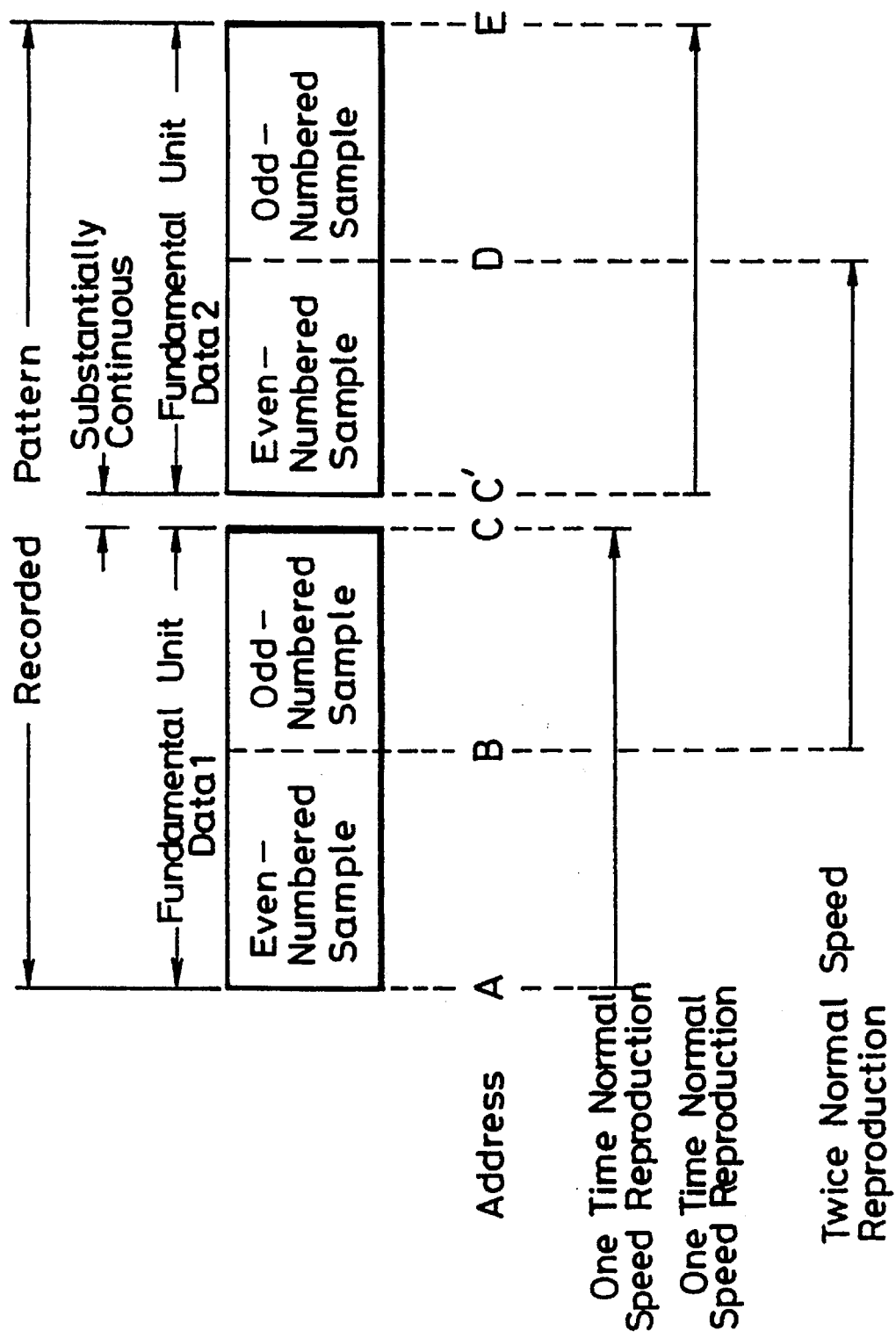
FIG. 8 is a schematic diagrams used to explain how to designate reproduction address according to the present invention.

How to designate the reproducing address according to the present invention will be described with reference to FIG. 8. The reproducing control unit 53 shown in FIG. 6 designates reproducing addresses for the fundamental unit data 1 and 2 of the recorded pattern. Specifically, the reproducing control unit 53 designates the address A to one fundamental unit data, i.e., address C for the fundamental unit data 1 and the address C to one fundamental unit, i.e., address E for the fundamental unit data 2.

On the other hand, when the recording and reproducing head 24 reproduces data at twice normal reproducing speed, the reproducing control unit 53 designates address B to one fundamental unit data, i.e., address D. Thus, it is possible to obtain decimated twice normal reproducing speed data without changing amount of data read in the unit time, i.e., data amount of one fundamental unit.

If the twice normal speed reproduction data is interpolated, it is possible to reproduce data at speeds changed between one time normal reproducing speed and twice normal reproducing speed.

When the recording and reproducing head 24 reproduces data at one time normal reproducing speed, although data can be read out from the address B to the address D one time, the arrangement of the reproduction data control unit 54, such as the fundamental unit buffer 47 or the like cannot be made common.

A twice normal speed reproduction effected when data is recorded in the recorded pattern shown in FIG. 5A will be described with reference to FIG. 9A. In this case, as is clear from FIG. 9A, samples 1, 2, 3, . . . are reproduced and sample 22 is reproduced next to the last sample 21 of the odd-numbered group. Accordingly, while sample of every other one sample is reproduced within the odd-numbered group, consecutive sample is reproduced at a timing point in which the odd-numbered group is changed to the even-numbered group so that consecutiveness of signal is deteriorated. On the other hand, when data is recorded in the pattern shown in FIG. 5B, the state shown in FIG. 9B is presented so that sample of every other one sample is reproduced at a timing point in which the odd-numbered group is changed to the even-numbered group so that consecutiveness of signal becomes excellent. However, when data is recorded in the pattern shown in FIG. 5B, the rearranging order of the even-numbered sample and the odd-numbered sample in the fundamental unit data 1 and 2 has to be changed upon one time normal speed reproduction.

According to the present invention, since all quantized data within the fundamental unit are separated to the odd-numbered group and the even-numbered group and the odd-numbered group and the even-numbered group are separated and disposed on the first half and the second half or the second half or the first half of the recording fundamental unit, it is possible to set the length of the fundamental unit to be optimum for the one time normal speed reproduction. Also, it is possible to reproduce data at speed higher than one time normal speed with ease by changing the designating method of the reproduction address.

Furthermore, according to the present invention, since the orders in which the odd-numbered group and the even-numbered group are arranged become different between adjacent two recording fundamental units of the recording fundamental unit, it is possible to carry out the high speed reproduction with excellent continuity of signal.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A data recording apparatus for recording quantized data at every predetermined fundamental unit, comprising:

quantized means for quantizing a consecutive signal with a predetermined sampling frequency to generate quantized data;

separating means for separating each sample of said quantized data at every predetermined fundamental unit;

fundamental unit generating means for separating samples of said quantized data of every fundamental unit into an odd-numbered group formed of odd-numbered samples and an even-numbered group formed of even-numbered samples and disposing said odd-numbered group and said even-numbered group so that one of said odd-numbered group and said even-numbered group is disposed in a first consecutive half of said fundamental unit and the other is disposed in a second consecutive half of said fundamental unit to thereby form quantized data of every fundamental unit;

recording means for recording said quantized data on a recording medium; and recording control means for controlling said recording means so that quantized data of at least two consecutive fundamental units are recorded in substantially consecutive positions on said recording medium.

2. A data recording apparatus according to claim 1, further comprising:

reproducing means for reproducing said quantized data recorded on said recording medium; and reproduction control means for controlling said reproducing means such that quantized data of every one fundamental unit amount is reproduced from a start address of said odd-numbered group or said even-numbered group disposed on a second half of a first recording fundamental unit within two consecutive recording fundamental units.

3. A data recording apparatus according to claim 1, wherein said fundamental unit generating means generates quantized data of said recording fundamental unit in which the arrayed orders of said odd-numbered group and said even-numbered group are made different relative to at least two recording fundamental units recorded on said consecutive positions.

4. The data recording apparatus according to claim 1, wherein said recording medium is a disk-shaped recording medium.

5. A data reproducing apparatus for reproducing quantized data recorded on a recording medium at every predetermined fundamental unit, comprising:

reproducing means for reproducing said quantized data at every fundamental unit from a recording medium which contains recorded quantized data of at least two consecutive recording fundamental units in which quantized data resulting from quantizing a consecutive signal with a predetermined sampling frequency is separated at every predetermined fundamental unit, samples of said quantized data of each fundamental unit are separated into an odd-numbered group formed of odd-numbered samples and an even-numbered group formed of even-numbered samples and said odd-numbered group and said even-numbered group are arranged so that one of said odd-numbered group and said even-numbered group is disposed on a first consecutive half of the recording fundamental unit and the other is disposed on a second consecutive half of the recording fundamental unit; and reproducing control means for controlling said reproducing means so that, upon variable speed reproduction at a speed higher than one time normal speed, quantized data of one fundamental unit is reproduced from a starting portion of said odd-numbered group or said even-numbered group disposed on the second consecutive half of a first recording fundamental unit of said two consecutive recording fundamental units.

6. The data reproducing apparatus according to claim 4, wherein said recording medium is a disk-shaped recording medium.

7. A data recording method for recording quantized data on a recording medium at every predetermined fundamental unit comprising the steps of:

quantizing a consecutive signal at a predetermined sampling frequency to obtain quantized data;

separating samples of said quantized data at every predetermined fundamental unit;

separating samples of said quantized data of every fundamental unit into an odd-numbered group formed of odd-numbered samples and an even-numbered group formed of even-numbered samples;

forming quantized data of every recording fundamental unit by arranging said odd-numbered group and said even-numbered group such that one of said odd-numbered group and said even-numbered group is disposed on a first consecutive half of the recording fundamental unit and the other is disposed on a second consecutive half of the recording fundamental unit; and recording said quantized data on said recording medium so that consecutive quantized data of at least two recording fundamental units are recorded in substantially consecutive positions on said recording medium.

8. The data recording method according to claim 7, wherein said recording step comprises recording said quantized data onto a disk-shaped recording medium.

9. A data recording and reproducing method for recording and reproducing quantized data on and from a recording medium at every predetermined fundamental unit comprising the steps of:

quantizing a consecutive signal at a predetermined sampling frequency to obtain quantized data;

separating samples of said quantized data of every fundamental unit into an odd-numbered group formed of odd-numbered samples and an even-numbered group formed of even-numbered samples;

forming quantized data of every recording fundamental unit by arranging said odd-numbered group and said even-numbered group such that one of said odd-numbered group and said even-numbered group is disposed on a first consecutive half of the recording fundamental unit and the other is disposed on a second consecutive half of the recording fundamental unit;

recording said quantized data on said recording medium so that consecutive quantized data of at least two recording fundamental units are recorded in substantially consecutive positions on said recording medium; and reproducing said quantized data at a variable speed higher than one time normal speed by reproducing quantized data at every recording fundamental unit from a starting portion of said odd-numbered group or said even-numbered group disposed on the second consecutive half of a first recording fundamental unit of two consecutive recording fundamental units recorded on said recording medium.

10. The data recording and reproducing method according to claim 9, wherein said recording step comprises recording said quantized data onto a disk-shaped recording medium.

* * * * *